United States Patent
Bech et al.

(10) Patent No.: US 8,137,234 B2
(45) Date of Patent: Mar. 20, 2012

(54) GEARBOX FOR A WIND TURBINE, A METHOD OF CONVERTING WIND ENERGY AND USE OF A GEARBOX

(75) Inventors: Anton Bech, Ringkøbing (DK); Jens Demtrôder, Rønde (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/766,564

(22) Filed: Apr. 23, 2010

(65) Prior Publication Data

US 2010/0202871 A1    Aug. 12, 2010

Related U.S. Application Data

(63) Continuation of application No. PCT/DK2008/000372, filed on Oct. 22, 2008.

(30) Foreign Application Priority Data

Oct. 23, 2007  (DK) .............................. PA 2007 01525

(51) Int. Cl.
   *F16H 57/08* (2006.01)
(52) U.S. Cl. ........................................ 475/346; 475/347
(58) Field of Classification Search .................. 475/337, 475/346, 347
   See application file for complete search history.

(56) References Cited

U.S. PATENT DOCUMENTS

| | | | |
|---|---|---|---|
| 3,757,608 A * | 9/1973 | Willner | 475/347 |
| 3,824,872 A | 7/1974 | Stolt et al. | |
| 3,854,349 A * | 12/1974 | Michling | 475/337 |
| 5,154,676 A * | 10/1992 | Kim | 475/317 |
| 5,279,527 A * | 1/1994 | Crockett | 475/57 |
| 2004/0162181 A1 | 8/2004 | LaBath | |

FOREIGN PATENT DOCUMENTS

| | | |
|---|---|---|
| AT | 403310 B * | 11/1997 |
| AT | 403310 B | 1/1998 |
| DE | 1550730 A1 | 7/1969 |
| FR | 958710 A | 3/1950 |
| JP | 2003269553 A | 9/2003 |
| WO | 03031811 A2 | 4/2003 |
| WO | 2006080127 A1 | 8/2006 |

OTHER PUBLICATIONS

Danish Search Report; PA 2007 01525; Jun. 6, 2008; 1 page.
International Preliminary Report on Patentability; PCT/DK2008/000372; Jan. 21, 2010; 9 pages.
International Search Report; PCT/DK2008/000372; Jun. 16, 2009; 3 pages.

* cited by examiner

*Primary Examiner* — Justin Holmes
(74) *Attorney, Agent, or Firm* — Wood, Herron & Evans, L.L.P.

(57) ABSTRACT

A gearbox for a wind turbine. The gearbox includes at least one first epicyclical gear stage, at least one second gear stage, and a torque transferring shaft including a shaft part and a connection part, wherein the torque transferring shaft is adapted for connecting a first gear of the first epicyclical gear stage with a second gear of the second gear stage and wherein the torque transferring shaft is connected to the second gear stage via the connection part to form a torque-transferring connection area between the connection part and the second gear stage and wherein the outer diameter of the shaft part of the torque transferring shaft is smaller than an inner diameter of the connection area between said torque transferring shaft and said second gear stage.

18 Claims, 6 Drawing Sheets

GEARBOX FOR A WIND TURBINE, A METHOD OF CONVERTING WIND ENERGY AND USE OF A GEARBOX

CROSS-REFERENCE TO RELATED APPLICATIONS

The present application is a continuation of pending International patent application PCT/DK2008/000372 filed on Oct. 22, 2008 which designates the United States and claims priority from Danish patent application PA 2007 01525 filed on Oct. 23, 2007, the content of which is incorporated herein by reference.

FIELD OF THE INVENTION

The invention relates to a gearbox for a wind turbine. The gearbox comprises at least one first epicyclical gear stage, at least one second gear stage, and a torque transferring shaft comprising a shaft part and a connection part, wherein the torque transferring shaft is adapted for connecting a first gear of the first epicyclical gear stage with a second gear of the second gear stage. The invention further relates to a method of converting wind energy into electrical energy in a wind turbine and use of a gearbox.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated in FIG. 1.

As large modern wind turbines get larger and larger both in size and in power output, it becomes more and more challenging to ensure that the enormous torque load from the rotor is transferred efficiently to the power generator. For example, in the wind turbine gearbox all the many gears have to mesh substantially correctly at all times to avoid unwanted noise and wear. But the gearbox of a large modern wind turbine is heavily strained when transferring and gearing the massive rotor load and it is therefore important to ensure that the gearbox structure and the strengthening structure of the nacelle is strong enough to ensure this alignment. But a strengthening structure large enough to ensure that all the elements of the drive train in the nacelle are substantially aligned at all times will become very large, heavy and expensive in a large modern wind turbine.

It is therefore also known to design the wind turbine so that some of the gearbox parts can accept some misalignment without it substantially affecting the mesh between the gears.

An object of the invention is therefore to provide for an advantageous technique for transferring torque between the stages of a wind turbine gearbox.

SUMMARY OF THE INVENTION

The invention provides for a gearbox for a wind turbine. The gearbox comprises at least one first epicyclical gear stage, at least one second gear stage, and a torque transferring shaft comprising a shaft part and a connection part, wherein the torque transferring shaft is adapted for connecting a first gear of the first epicyclical gear stage with a second gear of the second gear stage and wherein the torque transferring shaft is connected to the second gear stage via the connection part to form a torque-transferring connection area between the connection part and the second gear stage and wherein the outer diameter of the shaft part of the torque transferring shaft is smaller than an inner diameter of the connection area between the torque transferring shaft and the second gear stage.

Epicyclic gear stages are very efficient at handling large torque loads as well as some radial load because of the substantially symmetrical load distribution through the stage. However the output typically is delivered through one single shaft and it is therefore particularly advantageous that the torque transferring shaft is provided with misalignment compensating means if at least one of the stages in an epicyclic gear stage.

By making the connection area at a larger diameter than the outer diameter of the shaft part, it is hereby possible to allow for axial flexure between the shaft and the connection area substantially without affecting the shafts stiffness towards torsion. This is advantageous in that this axial flexure entails that the first gear can be misaligned and it is thereby possible to increase the chance of the first gear meshing correctly substantially without affecting the shafts ability to transfer large torque loads even though the planet carrier or the entire gearbox strengthening structure flexes.

In an aspect of the invention, the inner diameter of the connection area is at least 50% larger that the outer diameter of the shaft part.

If the inner diameter of the connection area is too small in relation with the outer diameter of the shaft part, the axial and angular flexure of the intermediate area becomes too small and it is therefore advantageous to make the inner diameter of the connection area at least 50% bigger that the outer diameter of the shaft part.

In an aspect of the invention, a flexure zone is established in the connection part between the shaft part and the connection area.

Providing a flexure zone between the shaft and the connection area is advantageous because a large diameter flexure zone by nature will be relatively more rigid toward torsion and at the same time relatively more flexible axially, thereby enabling that such a torque transferring design becomes more effective at transferring large torque loads in a heavily strained wind turbine gearbox.

In an aspect of the invention, the flexure zone extends substantially radial between the shaft part and the connection area.

If the flexure zone was provided in an angle, the length of the flexure zone would have to be increased when extending between a shaft of a given outer diameter and a connection area of a given inner diameter. Although in some configurations this could increase the flexure zone's ability for compensating for misalignment, it would also reduce the strength of the flexure zone torsion-wise and thereby increase the risk of backlash, fatigue failure or other.

In an aspect of the invention, the second gear stage is a cog wheel gear stage.

A cog wheel gear stage, where at least two cog wheels of similar module but different diameters mesh to create a ratio, is an inexpensive and efficient way of gearing the rotational speed in the drive train.

In an aspect of the invention, the first gear of the first gear stage is a sun gear of an epicyclic gear stage.

The sun gear of an epicyclic gear stage is particularly sensitive towards misalignment in that the sun gear typically meshes with at least three planet gears and in that the sun gear has to transfer the entire rotor torque load to the next gear stage and it is therefore particularly advantageous if the torque transferring shaft comprises efficient means for compensating for misalignment if the first gear is a sun gear of an epicyclic gear stage.

Furthermore, the sun gear requires radial flexure to balance the load sharing between the planets and it is therefore advantageous if the first gear of the first gear stage is a sun gear of an epicyclic gear stage In an aspect of the invention, the connection area extends substantially radial.

By making the connection area extend substantially radial at a relatively large diameter it is ensured that the torque is transferred over a relatively large area thereby reducing local stress and the risk of micro slip.

In an aspect of the invention, the connection area substantially faces the first gear.

By making the connection area face the first gear it is possible to mount the sun gear from the side of the second gearbox stage. This is advantageous in that this side faces the centre of the nacelle and there is therefore room for mounting the first gear from this side, whereas a first gear mounted from the rotor side would be very difficult to access.

In an aspect of the invention, the first gear of the first gear stage is formed integrally with the torque transferring shaft.

The first gear has to be able to transfer large torque loads to the torque transferring shaft and by forming the gear integrally with the shaft, any risk of slip and wear is eliminated. Furthermore, expensive and complex connections or couplings between the gear and the shaft can be avoided.

In an aspect of the invention, the connection part is connected to the second gear of said second gear stage.

Hereby is achieved an advantageous embodiment of the invention.

In an aspect of the invention, the connection part is connected to a planet carrier of the second gear stage.

Hereby is achieved an advantageous embodiment of the invention.

In an aspect of the invention, the inner diameter of the connection area is larger than the length of the shaft part.

If the shaft part is longer than the inner diameter of the connection area the shaft part becomes so flexible that the flexure zone losses its misalignment compensating effect and the risk of backlash, fatigue failure or other is increased. However, as long as the inner diameter of the connection area is larger than the length of the shaft part, the effect of the flexure zone is best utilized.

In an aspect of the invention, the torque transferring shaft is rotated by an input torque applied to the first gear of the first gear stage.

Hereby is achieved an advantageous embodiment of the invention.

In an aspect of the invention, the torque transferring shaft is hollow.

Forming the torque transferring shaft as a hollow shaft is advantageous in that it enables free access between the gear stages through the hollow shaft.

Furthermore, a hollow shaft can be relatively rigid towards torsion and at the same time allow some radial flexure which is advantageous in combination with a flexure zone, in that if the torque transferring shaft is deflected in a given direction due to the flexure zone, the hollow shaft could enable a radial deflection in the opposite direction, whereby the centreline through the first gear is displaced from the centre line through the connection area but at the same time the two centrelines are substantially maintained parallel. This would enable that the first gear could be radially displaced substantially without affecting the mesh with other gears of the first stage.

In an aspect of the invention, the thickness of said flexure zone in the axial direction is substantially constant.

By making the axial thickness of the flexure zone constant it is easier to manufacture and it becomes easier to predict the deflection under a given load.

In an aspect of the invention, the thickness of the flexure zone in the axial direction is less than the wall thickness of the hollow torque transferring shaft.

Making the axial thickness smaller than the wall thickness of the hollow torque transferring shaft is advantageous in that it is hereby ensured that not only the hollow shaft deflects, if the first gear is exposed to a radial load, but also the flexure zone deflects.

In an aspect of the invention, the connection part at the connection area comprises a positive engaging structure adapted for engaging a corresponding positive engagement structure of the second gear stage.

It is advantageous that the connection part and the second gear stage at the connection area are provided with positive engagement structures which are mutually engaging in that it hereby is ensured that the large torque load is transferred at all times substantially without wearing the coupling.

In an aspect of the invention, the positive engagement structure of the connection part is formed as substantially radial extending teeth.

To transfer torque efficiently it is important that the positive engagement structure is established substantially transverse to the direction of rotation and it is therefore advantageous that the teeth extends radial.

Furthermore, teeth are an efficient way of utilizing the coupling area in that teeth will ensure that the torque is transferred over a relatively large area thereby reducing local stress and the risk of micro slip.

Even further, teeth extending radially from the centre of the coupling in substantially all directions will further provide the coupling with the ability of handling radial loads in that at least some of the teeth will always lock the coupling towards radial movement no matter the direction of the radial load.

In an aspect of the invention, the inner diameter of the connection area is larger than the outer diameter of the first gear.

By making the connection area larger than the outer diameter of the first gear, it is possible to mount and dismantle the torque transferring shaft through an opening in the second gear. This is advantageous in that the first gear stage faces the rotor and the second gear stage faces the middle of the nacelle and it is hereby possible to mount or exchange the torque transferring shaft from the nacelle side of the gearbox thereby simplifying the procedure.

In an aspect of the invention, the part of the second gear stage to which the connection part is connected comprises a centre aperture through which the first gear can be mounted and dismantled.

Providing the planet carrier of the second gear of the second gear stage with a centre aperture is advantageous in that the first gear can be mounted and dismantled from the second gear stage side of the gear box which would provide more free space to perform the process.

Furthermore, the invention provides for a method of converting wind energy into electrical energy in a wind turbine comprising a gearbox according to any of the aspects described above.

Even further, the invention provide for use of a gearbox according to any of the above regarding gearboxes in a Megawatt wind turbine.

The larger the wind turbine is in power output the larger the wind turbine or at least some of the wind turbine parts also has to be physically. Wind turbines with a rated power output above one Megawatt have to transfer so large torque loads through the gearbox that it becomes increasingly difficult to maintain the alignment of the gearbox parts or to compensate for any misalignment with known means. Furthermore, with so large wind turbines, an imbalanced load, varying imbalanced load, sudden load peaks and other will have a great affect on alignment of the gearbox parts and it is therefore particularly advantageous to use a gearbox according to the invention in a Megawatt wind turbine.

BRIEF DESCRIPTION OF THE DRAWINGS

The invention will be described in the following with reference to the figures in which.

DETAILED DESCRIPTION OF THE INVENTION

Figure 1:
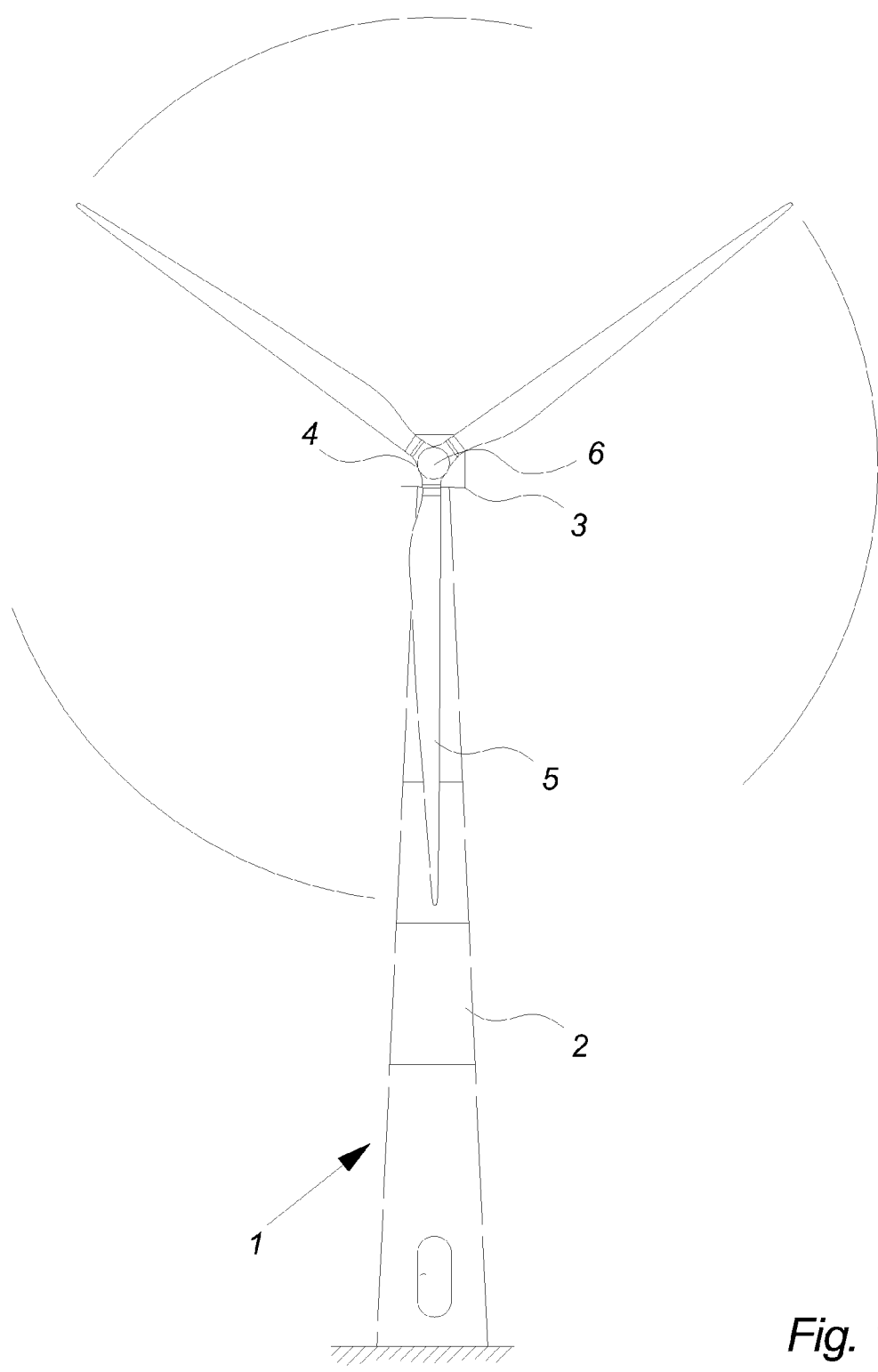
FIG. 1 illustrates a large modern wind turbine known in the art, as seen from the front.

FIG. 1 illustrates a modern wind turbine 1, comprising a tower 2 placed on a foundation and a wind turbine nacelle 3 positioned on top of the tower 2. The wind turbine rotor 4, comprising three wind turbine blades 5 extending from and connected to a common hub 6, is connected to the nacelle 3 through the main shaft which extends out of the nacelle 3 front.

Figure 2:
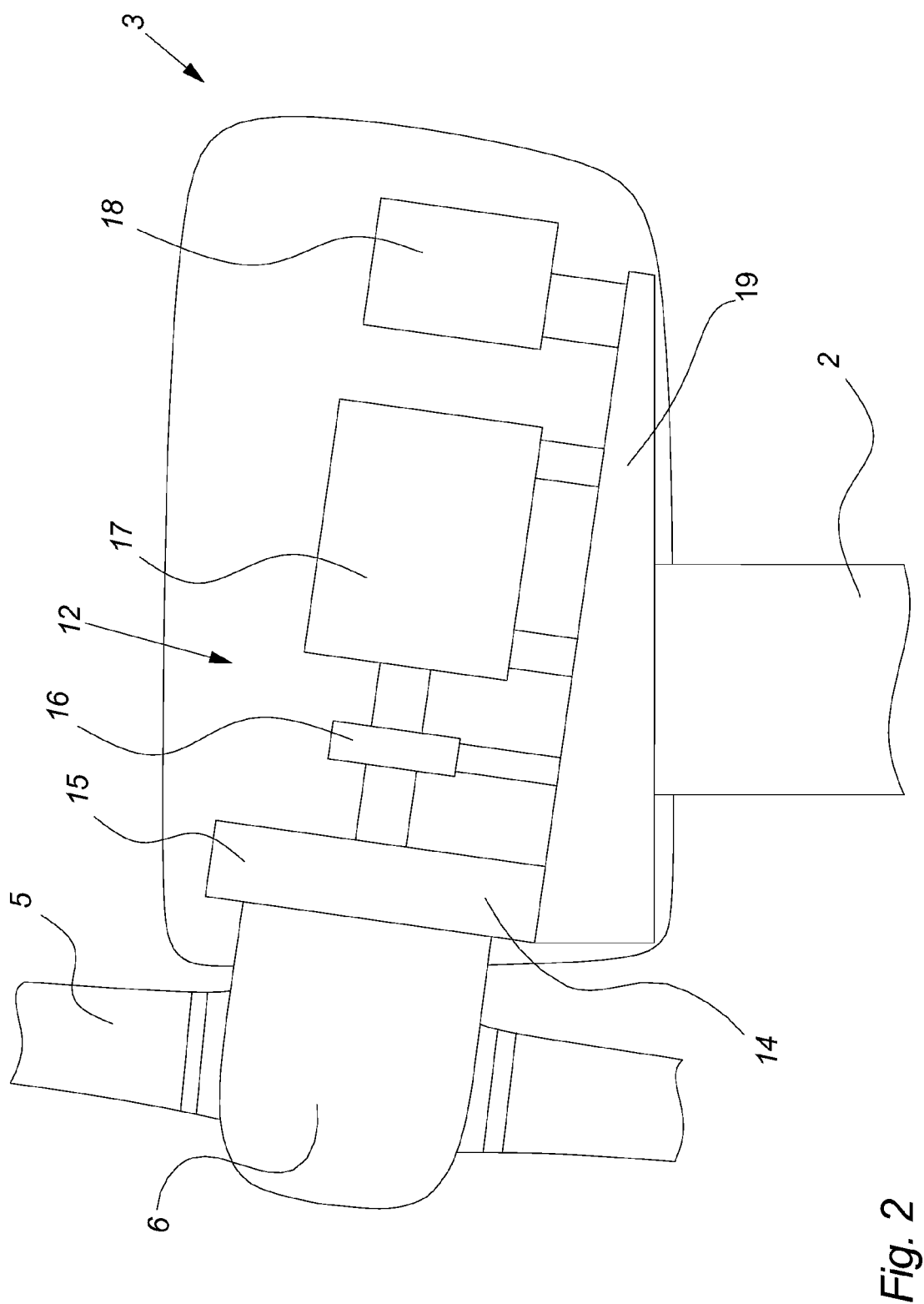
FIG. 2 illustrates a simplified cross section of a nacelle, as seen from the side.

FIG. 2 illustrates a simplified cross section of a nacelle 3 of a prior art wind turbine 1, as seen from the side. Nacelles 3 exists in a multitude of variations and configurations but in most cases the drive train 12 in the nacelle 3 almost always comprise one or more of the following components: a gearbox 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment the load carrying nacelle structure 19 only extends along the bottom of the nacelle 3 e.g. in form of a bed frame to which some or all the components 15, 16, 17, 18 are connected. In another embodiment the load carrying structure 19 could comprise a gear bell which through the main bearing 14 could transfer the load of the rotor 4 to the tower 2, or the load carrying structure 19 could comprise several interconnected parts such as latticework.

The nacelle further comprise a main bearing 14 for ensuring that the rotor 4 can rotate substantially freely in relation to the nacelle structure 19 and the fixed drive train parts 15, 16, 17, 18 of the nacelle 3. In this embodiment the of a drive train 12 the main bearing 14 is integrated in the gearbox 15 in that the rotor 4 is connected directly to the gearbox 15 via the hub 6. Because the main bearing 14 is incorporated in the gearbox 15, the gearbox structure has to be able to transfer the entire load of the rotor 4 to the tower 2 by means of the nacelle strengthening structure 19.

Figure 3:
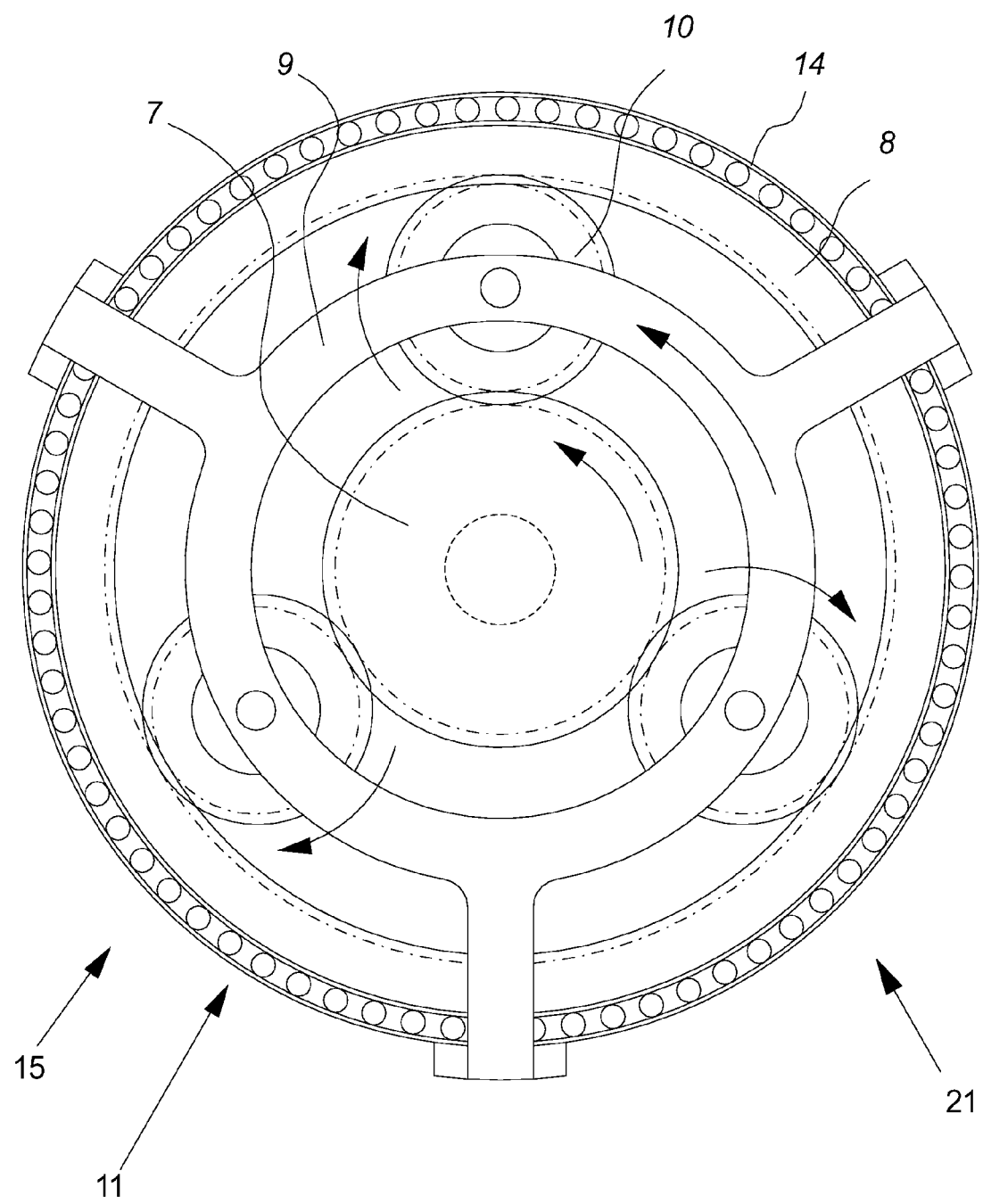
FIG. 3 illustrates an embodiment of an epicyclical gear stage of a wind turbine gearbox, as seen from the front.

FIG. 3 illustrates an embodiment of an epicyclical stage 11 of a wind turbine gearbox 15, as seen from the front.

In this embodiment of an epicyclical stage of a wind turbine gearbox 15 the planet gears 10 meshes with and rotates around a sun gear 7 in the middle. The planet gears 10 further meshes with an outer annulus gear 8. The arrows indicate that the planet gears 10 all rotate in the same direction and that the sun gear 7 rotates in the opposite direction.

In this embodiment, the wind turbine rotor 4 is connected substantially directly to a planet carrier 9 in that the outer peripheral part (not shown) of the hub 6 is connected to the planet carrier 9 at a relatively large diameter.

In another embodiment, the rotor 4 could also be connected to the gearbox 15 by means of a low speed main shaft 24 or other.

The planet carrier 9 connects the planet gears 10 by fixating the planet gear shafts to the common planet carrier structure 9.

Typically the annulus gear 8 is connected to a carrying frame, to the gearbox housing or is in other ways fixed, but in some epicyclical gearboxes 15 types the annulus gear 8 could also rotate.

Furthermore, the illustrated gears show only one epicyclical stage 11 of a gearbox 15. However, to increase the overall gearing of the gearbox it is well known to provide a wind turbine gearbox 15 with a number of stages 11 as the one shown, another configuration of a epicyclical gear stage 11, a cog wheel gear stage 13, another type of gear stage or any combination thereof, for example, depending on what type of wind turbine 1 the gearbox 15 is to be used in, under which conditions it is to be used or other.

In this embodiment, the planet carrier 9 is formed as a structure connecting the three planet gears 10. The carrier 9 further comprises arms for connecting the carrier 9 to the main bearing 14. When the rotor 4 is connected directly to the carrier 9 the planet carrier 9 also has to transfer the entire load of the rotor 4 to the load carrying nacelle structure 19 and/or to the tower 2. The inner ring of a large diameter main bearing 14 is therefore mounted on the outside of the annulus gear 8 and the outer ring of the main bearing 14 is connected to the planet carrier 9, which extend beyond the annulus gear 8. The main bearing 14 is hereby integrated in the gearbox 15.

In another embodiment, a more or less circular planet carrier 9 could be provided with a main bearing 14 around its outer perimeter, where the outer ring of the main bearing 14 was connected to the annulus gear 8, the gearbox housing or in other ways fixed.

In a further embodiment, the epicyclical gearbox 15 would be separate from the main bearing 14, for example, if a low speed main shaft 24 from the rotor 4 were provided with one or more main bearings 14 before the shaft was connected to the gearbox 15.

Figure 4:
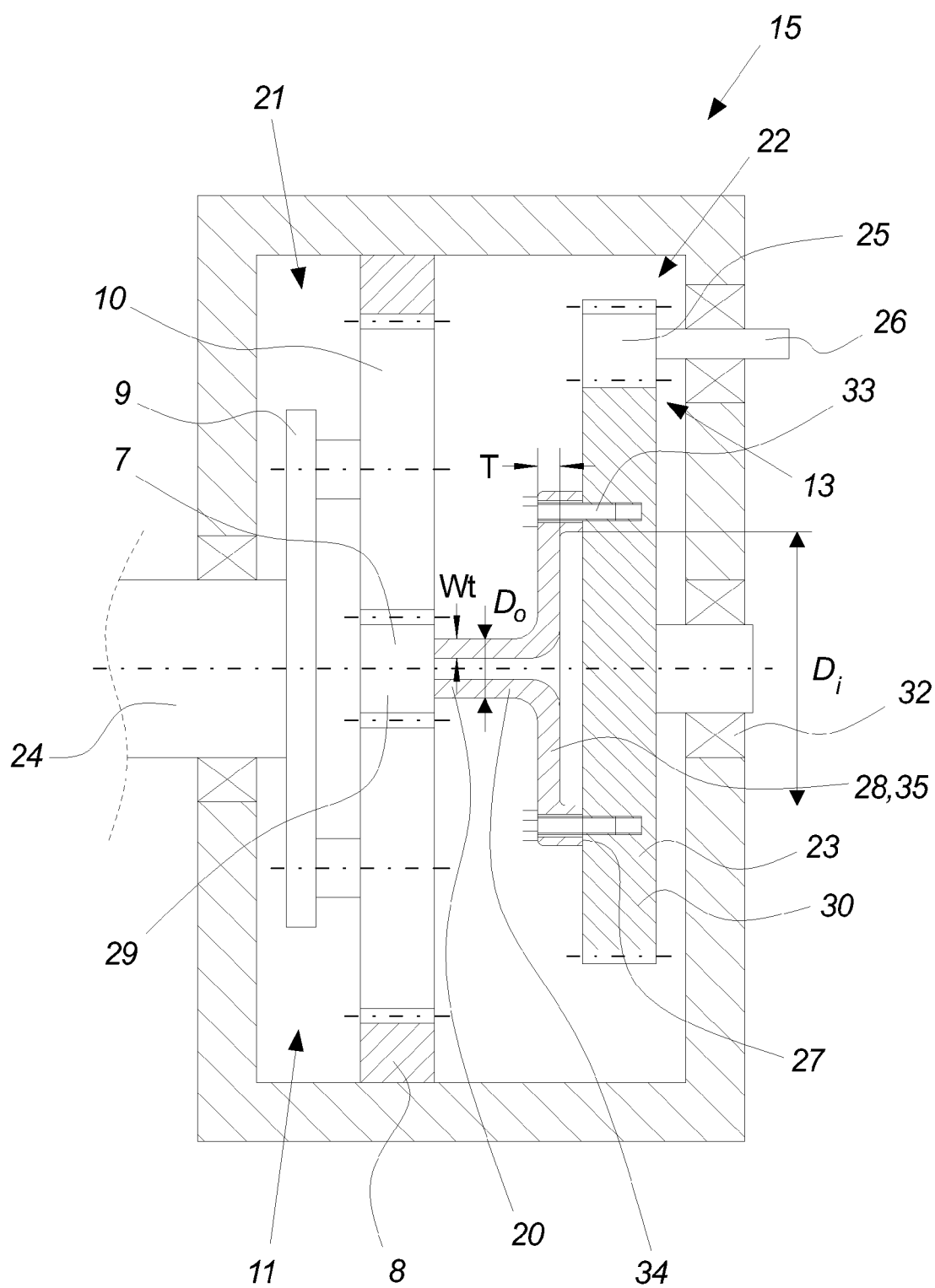
FIG. 4 illustrates a cross section of a wind turbine gearbox comprising two gear stages, as seen from the side.

FIG. 4 illustrates a cross section of a wind turbine gearbox 15 comprising two gear stages 21, 22, as seen from the side.

In this embodiment of the invention, the gearbox 15 comprise a first gear stage 21—in the form of a epicyclical gear stage 11—which through a torque transferring shaft 20 connected to a first gear 29 of the first gear stage 21—in the form of a sun gear 7 of the epicyclical gear stage 11—is connected to a second gear 30 of a second gear stage 22—in the form of a large diameter cog wheel 23 meshing with a small diameter coq wheel 25 connected to the output shaft 26 of the gearbox 15.

In this embodiment, the shaft 20, transferring the entire torque load between the gear stages 21, 22, is connected to the large diameter cog wheel 23 through a large diameter connection part 35 comprising a connection area 27 with an inner diameter Di that is larger than the outer diameter Do of a shaft part 34 of the torque transferring shaft thereby establishing a radial extending flexure zone 28 in the connection part 35 between the shaft part 34 and the connection area 27.

In this embodiment, the shaft 20 is hollow allowing for some flexure of the shaft part 34 but if additional flexure is wanted it is not possible to simply reduce the outer diameter Do or the wall thickness Wt further without it affecting the shaft parts 34 and thereby the shafts 20 ability to transfer big torque loads. The radial extending flexure zone 28 however is very rigid radially but allows for flexure axially and is therefore able to compensated for some angle misalignment or displacement of the sun gear 7 and shaft part 34.

In this embodiment, the connection area 27 is located at the end of a protrusion along the outer periphery of the connection part 35 to enable that the flexure zone 28 is not abutting the neighbouring second gear 30, thereby enabling substantially free movement of the flexure zone 28 in both axial directions. To ensure substantially free flexure of the flexure zone 28 in both axial directions it is important that substantially no part of the flexure zone 28 in its radial extend is mounted against axially fixed parts or that the torque transferring shaft 20 in other ways are fixed against angular and/or axial flexure.

In this embodiment of the invention, the flexure zone 28 extends substantially radial from the shaft part 34, whereby the flexure zone 28 becomes very rigid towards torsion but allows for axial flexibility. In another embodiment, the flexure zone 28 could be established in any angle between 10° and 170°, preferably between 30° and 150° and most preferred between 45° and 135° in relation to a centerline of the torque transferring shaft 20.

In this embodiment, the flexure zone 28 is established with a constant thickness T throughout its radial extent but in another embodiment the axial thickness T could vary radially, for example, to ensure flexure at a desired diameter or to ensure non-linearity between deflection and load.

In this embodiment, the flexure zone 28 is formed substantially uniformly throughout its entire extent, but in another embodiment, the flexure zone 28 could be formed as spokes extending between the shaft part 34 and the connection area 27 or the thickness of the flexure zone 28 could vary angularly.

Figure 5:
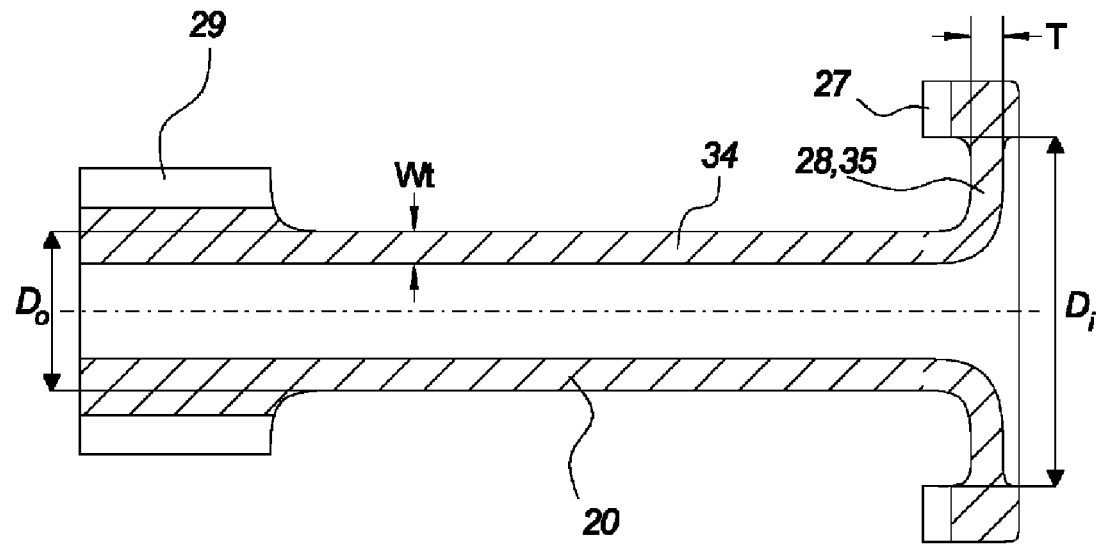
FIG. 5 illustrates a cross section of a torque transferring shaft comprising a first gear and a connection area, as seen from the side.

FIG. 5 illustrates a cross section of a torque transferring shaft 20 comprising a first gear 29 and a connection area 27, as seen from the side.

The illustrated torque transferring shaft 20 is for transferring large torque loads between two stages 21, 22 in a wind turbine gearbox 15, in that the torque transferring shaft 20 is provided with a first gear 29 being driven by a first gear stage 21 and a connection area 27 for transferring the torque to a second gear 30 of a second gear stage 22.

In this embodiment, the first gear 29 is formed integrally with the shaft part 34 of the torque transferring shaft 20 which again is formed integrally with the connection part 35 comprising the radial extending flexure zone 28.

However, in another embodiment of the invention, one or both of the first gear 29 and the connecting part 35 could also be formed separately from the torque transferring shaft 20, for example, if the first gear 29 and/or the connecting part 35 was attached to the shaft part 34 through a shrink joint, a bolted joint, a key joint, a pin joint or other or any combination hereof.

In this embodiment, the connection area 27 faces the first gear 29 and the connection area 27 is provided with teeth extending transversely to the direction of rotation for engaging a corresponding structure on the second gear 30.

In this embodiment, the torque transferring shaft 20 is hollow in that the shaft part 34 has a wall thickness Wt and the axial extent of the flexure zone 28 is substantially constant, i.e., the flexure zone 28 has a substantially constant axial thickness T.

In this embodiment, the axial thickness T of the flexure zone 28 is slightly smaller than the wall thickness Wt of the shaft part 34 to enable that the flexure zone 28 and the shaft part 34 both deflect if the first gear 29 is loaded radially.

If the axial thickness T of the flexure zone 28 is too big in relation to the wall thickness Wt of the shaft part 34, substantially only the shaft part 34 will deflect if the first gear 29 is radially loaded and if the wall thickness Wt of the shaft part 34 is too big in relation to the axial thickness T of the flexure zone 28, substantially only the flexure zone 28 will deflect if the first gear 29 is radially loaded. This could be disadvantageous in that if only one of the two deflects, the first gear 29 could be displaced angularly, making the mesh with other gears uneven and thereby increase the wear of the gears 29, 10.

Figure 6:
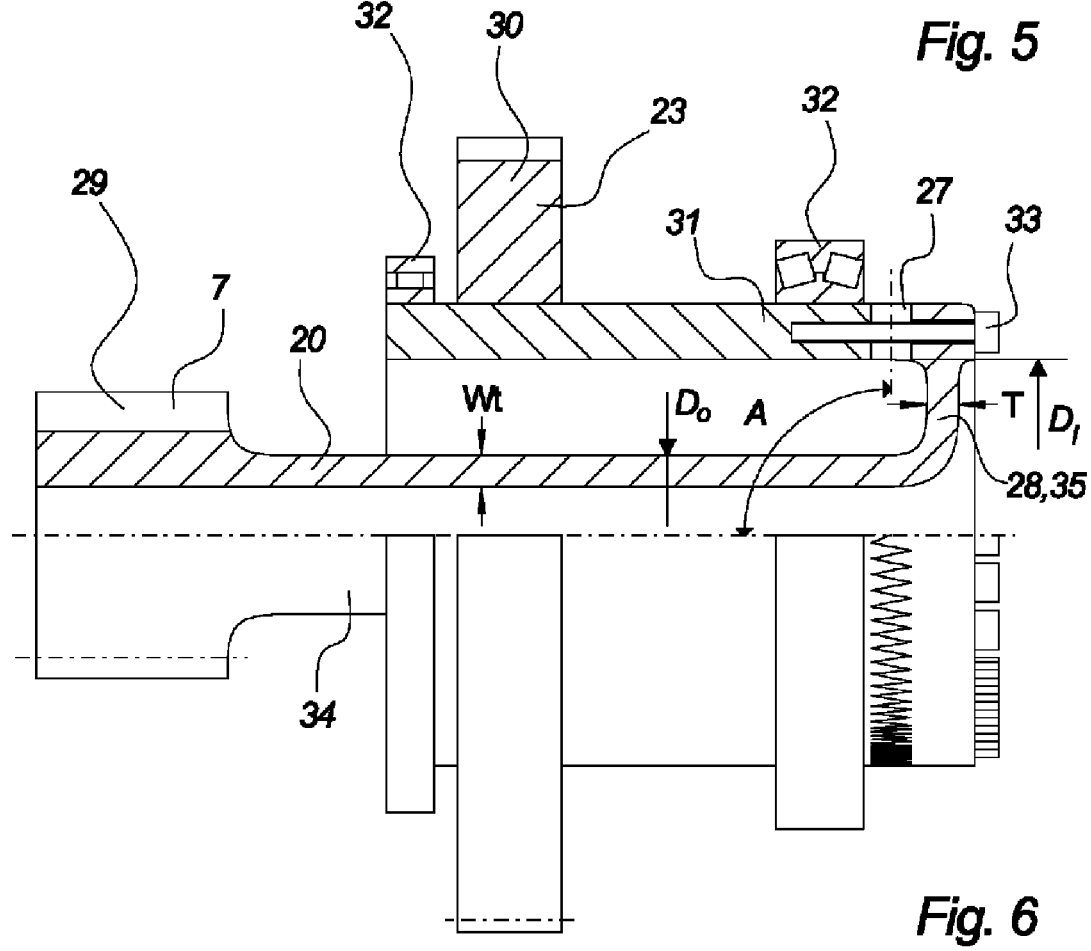
FIG. 6 illustrates a partial cross section of a sun gear and a torque transferring shaft, as seen from the side.

FIG. 6 illustrates a partial cross section of a sun gear 7 and a torque transferring shaft 20, as seen from the side.

In this embodiment of the invention, the first gear 29 which is connected to the torque transferring shaft 20 as illustrated in FIG. 5 is used as a sun wheel 7 in the planetary stage 11 of a wind turbine gearbox 6. The torque generated by the planet gears (not shown) meshing with the sun gear 7 is transferred to a gear hub 31 of a second gear 30 of a gear transmission stage 13 of the wind turbine gearbox 15 via the shaft part 34, the flexure zone 28 and connection area 27.

Two bearings 32 substantially ensure the alignment of the second gear 30 while the elongated shaft part 34 in combination with the flexure zone 28 ensures some radial flexibility of the sun gear 7.

In this embodiment, the connection part 35 at the connection area 27 and the corresponding area on the hub 31 of the second gear 30 comprise a positive engaging structure in the form of alternating bulges and recesses covering the connection part 35 over the entire connection area 27.

In this embodiment of the invention, the connection part 35 further comprise fixation means 33 for maintaining the connection part 35 engaged with the corresponding area on the hub 31 at all times thereby ensuring the torque transferring quality of the connection area 27—and to enable that the torque transferring shaft 20 is able to transfer an axial load which would attempt to push the connection part 35 and the corresponding area on the hub 31 apart.

If axial loads in a dominant axial direction are present, for example, in a helical geared planet stage 11, the choice between the part 35 configurations at the connection area 27 disclosed in FIG. 4 and FIG. 6 would be made so that the bolts 33 are substantially not loaded.

In this embodiment, the connection means 33 are bolts extending through apertures in the connection part 35 at the connection area 27 and engaging threaded blind holes in the corresponding area on the hub 31 but in another embodiment the fixation means 33 could be clamps, screws, rivets or other.

In this embodiment of the invention, the positive engaging structure of the connection part 35 and the corresponding area on the hub 31 are designed to lock the parts at the connection area 27 toward radial movement but in another embodiment the torque transferring shaft 20 or other could comprise a separate spigot engaging and guiding the connection area 27 and the hub 31, radial load means could be formed integrally in the connection part 35 or the hub 31 or it could in another way be ensured that the connection part 35 and the hub 31 are fixed against relative radial movement.

In this embodiment of the invention, the inner diameter Di of the connection area 27 or the hub 31 is bigger than the outer diameter of the sun wheel 7 hereby enabling that the sun wheel 7 can be dismounted through the hub 31.

In this embodiment, the shaft part 34 of the torque transferring shaft 20 is relatively long and thin-walled to ensure that the sun wheel 7 can flex a little radial in relation to the connection part 35 both transversely and regarding parallelism with the axis of rotation of the connection part 35. This shaft flexure is further supplemented by the flexure of the flexure zone 28 between the shaft part 34 and the connection area 27 and together the hollow shaft part 34 and the flexure zone 28 ensures that it is possible to compensate for any temporary or permanent misalignment in the gearbox 15 substantially without affecting the sun wheels 7 and planet gears 10 ability to transfer and evenly share torque.

In this embodiment of the invention, the connection area 27 is established in a face angle A of 90°, but in another embodiment the face angle A could be established in any angle between 10° and 170°, preferably between 30° and 150° and most preferred between 45° and 135°.

By arranging the connection area 27 in a face angle A different from 90°, the connection part 35 becomes substantially self-aligning due to the coning shape of the connection area 27.

Figure 7:
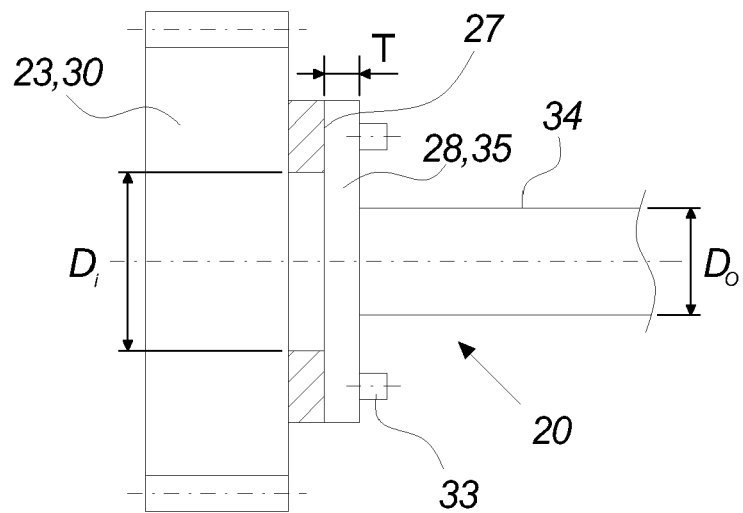
FIG. 7 illustrates a torque transferring shaft connected to a second gear through a distance ring, as seen from the side.

FIG. 7 illustrates a torque transferring shaft 20 connected to a second gear 30 through a distance ring, as seen from the side.

In this embodiment of the invention, the connection area 27 is established as the area between the part of the connecting part 35 of the torque transferring shaft 20 which is in contact with the distance ring hereby enabling that the flexure zone 28 can flex in both axial directions.

Figure 8:
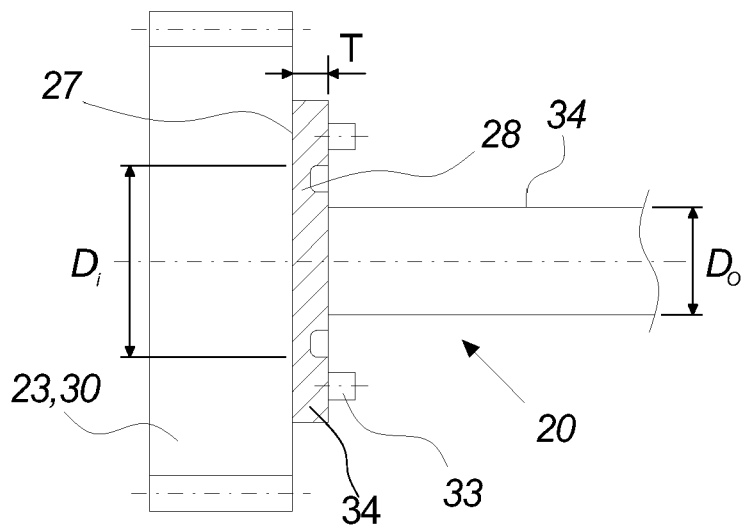
FIG. 8 illustrates a cross section of an embodiment of a flexure zone, as seen from the side.

FIG. 8 illustrates a cross section of an embodiment of a flexure zone 28, as seen from the side.

In this embodiment, the flexure zone of the flexure zone is established by a recess in the connection part 35, thereby enabling that the flexure zone 28 can flex in one axial direction.

In this embodiment, the connection area 27 is defined as the area where the connection part 35 is positively connected to the second gear 30 i.e. the area at and immediately surrounding the connection means 33.

Figure 9:
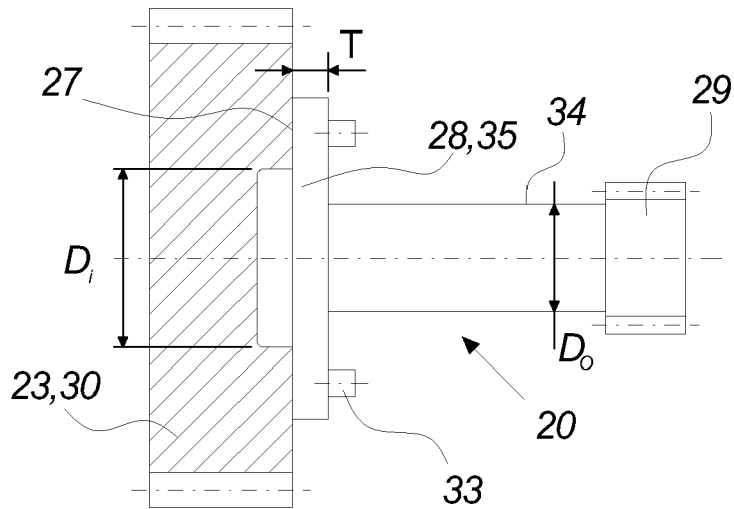
FIG. 9 illustrates a second gear comprising a recess for establishing a flexure zone, as seen from the side.

FIG. 9 illustrates a second gear 30 comprising a recess for establishing a flexure zone 28, as seen from the side.

In this embodiment of the invention, axial flexure of the flexure zone 28 is enabled in both directions by providing the second gear with an indentation.

The invention has been exemplified above with reference to specific examples of torque transferring shafts 20, flexure zones 28, gearboxes 15 and other. However, it should be understood that the invention is not limited to the particular examples described above but may be designed and altered in a multitude of varieties within the scope of the invention as specified in the claims.

What is claimed is:

1. A gearbox for a wind turbine, comprising:
    at least one first epicyclical gear stage including a first gear having a first axis of rotation that extends through the first gear,
    at least one second gear stage including a second gear having a second axis of rotation that extends through the second gear, and
    a torque transferring shaft comprising a shaft part, a connection part, and a central shaft axis about which the shaft rotates, wherein the torque transferring shaft is adapted for connecting the first gear of the first epicyclical gear stage with the second gear of the second gear stage, wherein the torque transferring shaft is connected to the second gear stage via the connection part to form a torque-transferring connection area between the connection part and the second gear stage, and wherein the first axis rotation, the second axis of rotation, and the shaft axis are aligned with each other,
    wherein an outer diameter of the shaft part of the torque transferring shaft is smaller than an inner diameter of the connection area between the torque transferring shaft and the second gear stage and wherein a flexure zone is established in the connection part between the shaft part and the connection area, and
    wherein the connection area substantially faces the first gear.

2. The gearbox according to claim 1, wherein the inner diameter of the connection area is at least 50% larger than the outer diameter of the shaft part.

3. The gearbox according to claim 1, wherein the flexure zone extends substantially radial between the shaft part and the connection area.

4. The gearbox according to claim 1, wherein the thickness of the flexure zone in the axial direction is substantially constant.

5. The gearbox according to claim 1, wherein the second gear stage is a cog wheel gear stage.

6. The gearbox according to claim 1, wherein the first gear of the first gear stage is a sun gear of an epicyclic gear stage.

7. The gearbox according to claim 1, wherein the connection area extends substantially radial.

8. The gearbox according to claim 1, wherein the first gear of the first gear stage is formed integrally with the torque transferring shaft so as to form a monolithic body.

9. The gearbox according to claim 1, wherein the connection part is connected to the second gear of the second gear stage.

10. The gearbox according to claim 1, wherein the connection part is connected to a planet carrier of the second gear stage.

11. The gearbox according to claim 1, wherein the inner diameter of the connection area is larger than the length of the shaft part.

12. The gearbox according to claim 1, wherein the torque transferring shaft is rotated by an input torque applied to the first gear of the first gear stage.

13. The gearbox according to claim 1, wherein the torque transferring shaft is hollow.

14. The gearbox according to claim 13, wherein the thickness of the flexure zone in the axial direction is less than the wall thickness of the hollow torque transferring shaft.

15. The gearbox according to claim 1, wherein the connection part at the connection area comprises a positive engagement structure adapted for engaging a corresponding positive engaging structure of the second gear stage.

16. The gearbox according to claim 15, wherein the positive engagement structure of the connection part is formed as substantially radial extending teeth.

17. The gearbox according to claim 1, wherein the inner diameter of the connection area relative to the central shaft axis is larger than the outer diameter of the first gear relative to the central shaft axis.

18. The gearbox according to claim 1, wherein the part of the second gear stage to which the connection part is connected comprises a centre aperture through which the first gear can be mounted and dismantled.

* * * * *

UNITED STATES PATENT AND TRADEMARK OFFICE
CERTIFICATE OF CORRECTION

PATENT NO. : 8,137,234 B2
APPLICATION NO. : 12/766564
DATED : March 20, 2012
INVENTOR(S) : Anton Bech et al.

It is certified that error appears in the above-identified patent and that said Letters Patent is hereby corrected as shown below:

Column 1, lines approx. 43-44, "... gearbox structure and the strengthening structure of the nacelle is ..." should read --... gearbox structure and the strengthening structure of the nacelle are ...--

Column 2, line approx. 10, "...if at least one of the stages in an epicyclic gear stage." should read --... if at least one of the stages is an epicyclic gear stage.--

Column 2, lines approx. 41-42, "... zone extends substantially radial between ..." should read --... zone extends substantially radially between ...--

Column 3, lines approx. 5-6, "... area extends substantially radial." should read --... area extends substantially radially.--

Column 3, line approx. 7, "... area extend substantially radial ..." should read --... area extend substantially radially ...--

Column 3, lines approx. 39-40, "... part becomes so flexible that the flexure zone losses its misalignment..." should read --... part becomes so flexible that the flexure zone loses its misalignment ...--

Column 4, lines approx. 22-23, "... part is formed as substantially radial extending teeth." should read --... part is formed as substantially radially extending teeth.--

Column 4, line approx. 27, "... that the teeth extends radial." should read --... that the teeth extend radially.--

Column 4, line approx. 61, "... the invention provide for use ..." should read --... the invention provides for use ...--

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,137,234 B2

Column 5, lines approx. 44-47, "Nacelles 3 exist in a ... but in most cases the drive train 12 ... comprise one or more ..." should read --Nacelle 3 exists in a ... but in most cases the drive train 12 ... comprises one or more ...--

Column 5, line approx. 48, "... some sort of breaking system ..." should read --... some sort of braking system ...--

Column 5, line approx. 66, "The nacelle further comprise a ..." should read --The nacelle further comprises a ...--

Column 6, line approx. 2, "In this embodiment the of a drive train 12 the main bearing 14 is ..." should read --In this embodiment of the drive train 12 the main bearing 14 is ...--

Column 6, lines approx. 12-13, "... the planet gears 10 meshes with and rotates around ..." should read --... the planet gears 10 mesh with and rotate around ...--

Column 6, lines approx. 13-14, "The planet gears 10 further meshes with ..." should read --The planet gears 10 further mesh with ...--

Column 6, lines approx. 28-30, "... but in some epicyclic gearboxes 15 types the annulus gear could also rotate." should read --... but in some types of epicyclic gearboxes 15 the annulus gear could also rotate.--

Column 6, lines approx. 63-64, "... the gearbox 15 comprise a ..." should read --... the gearbox 15 comprises a ...--

Column 7, line 3, "... coq wheel 25 ..." should read --... cog wheel 25 ...--

Column 7, line approx. 31, "... shaft 20 in ... are fixed ..." should read --... shaft 20 in ... is fixed ...--

Column 7, line approx. 34, "... extends substantially radial from the ..." should read --... extends substantially radially from the ...--

Column 7, line approx. 64, "... the radial extending ..." should read --... the radially extending ...--

Column 8, line 1, "... if the first gear 29 and/or the connecting part 35 was ..." should read --... if the first gear 29 and/or the connecting part were ...--

Column 8, lines approx. 47-48, "... the connection part 35 further comprise ..." should read --... the connection part 35 further comprises ...--

Column 9, line approx. 14, "... can flex a little radial in relation to ..." should read --... can flex a little radially in relation to ...--

CERTIFICATE OF CORRECTION (continued)
U.S. Pat. No. 8,137,234 B2

Column 9, lines approx. 19-20, "... together the hollow shaft part 34 and the flexure zone 28 ensures that ..." should read --... together the hollow shaft part 34 and the flexure zone 28 ensure that ...--

Column 10, line 13, Claim 1, "... first axis rotation, ..." should read --... first axis of rotation, ...--

Column 10, line 27, Claim 3, "... zone extends substantially radial between ..." should read --... zone extends substantially radially between ...--

Column 10, line 37, Claim 7, "... area extends substantially radial." should read --... area extends substantially radially.--

Column 11, line 3, Claim 16, "... substantially radial extending teeth." should read --... substantially radially extending teeth.--